No. 749,504. PATENTED JAN. 12, 1904.
T. O. TOLLACK.
PLOW.
APPLICATION FILED FEB. 10, 1903.
NO MODEL.
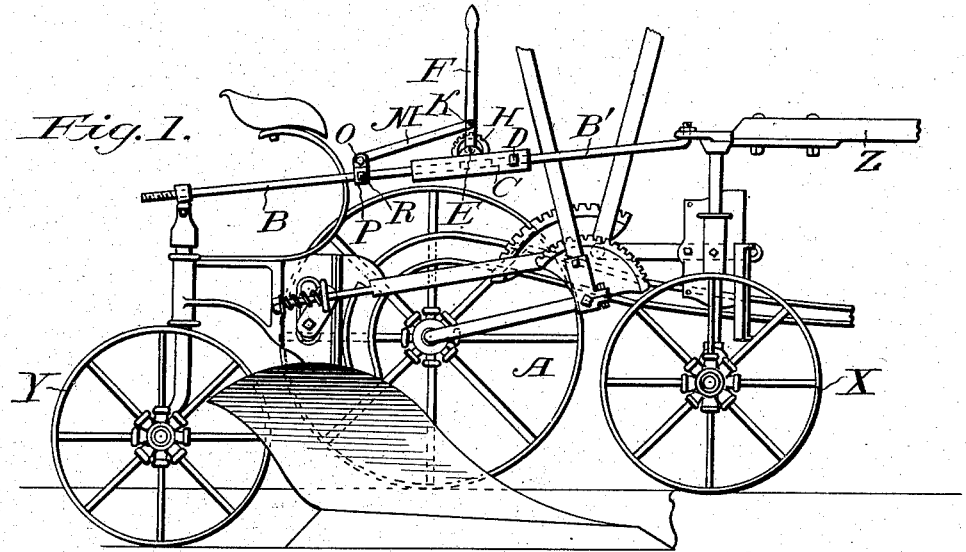
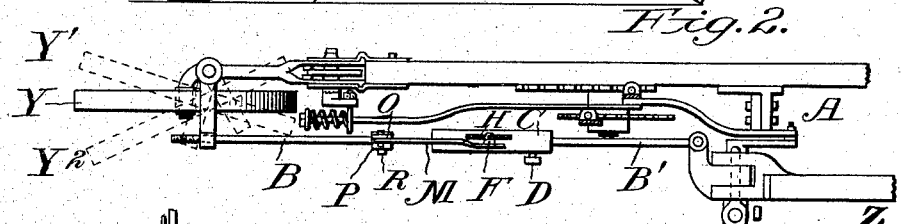
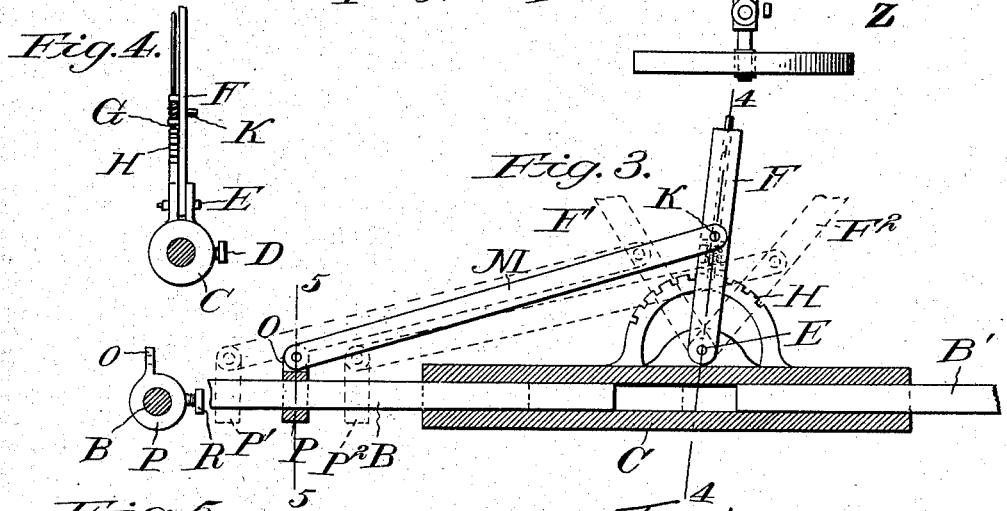
Theodore O Tollack
Inventor
Witnesses
C. H. Walker.
J. M. Moore.
By
L. F. Morrill
Attorney No. 749,504.

Patented January 12, 1904.

UNITED STATES PATENT OFFICE.

THEODORE O. TOLLACK, OF CURRAN, WISCONSIN.

PLOW.

SPECIFICATION forming part of Letters Patent No. 749,504, dated January 12, 1904.

Application filed February 10, 1903. Serial No. 142,715. (No model.)

*To all whom it may concern:*

Be it known that I, THEODORE O. TOLLACK, a citizen of the United States, residing at the town of Curran, in the county of Jackson and State of Wisconsin, have invented certain new and useful Improvements in Plows, of which the following is a specification.

My invention relates to wheeled plows, more especially to the kind having three wheels, two of which are caster or swivel wheels, one secured to and turning with the tongue or pole, and the other, the rear one, turning in an opposite direction through the medium of crank-arms or similar mechanism secured to the spindle of the two caster-wheels and connected by a rod.

The object of my invention is to provide means whereby the rod connecting the crank-arms of the caster-wheels may be lengthened or shortened at the will of the operator.

It has been practically demonstrated that in attempting to operate a plow of this description on a side hill the plow will cut too wide or too narrow, according as the furrow is being turned up or down hill, thereby detracting from the quality and quantity of work accomplished. To obviate this difficulty is the prime object of my present invention, and I accomplish my purpose by castering the rear wheel so that it draws the plow toward or away from the land, and such castering I accomplish by lengthening or shortening the rod connecting such rear caster-wheel to the front caster-wheel, the direction of such front caster-wheel, being determined by the pole to which it is secured.

In the accompanying drawings, Figure 1 is a side elevation of any plow of the description mentioned, showing also in side elevation my invention. Fig. 2 is a plan view of the front and rear caster-wheels of such a plow connected by a rod furnished with my invention. Fig. 3 is a sectional view; Fig. 4, a transverse sectional view on line 4 4, Fig. 3. Fig. 5 is a transverse sectional view on line 5 5, Fig. 3.

Similar letters refer to similar parts throughout the drawings.

A represents a plow of any make constructed with two caster-wheels—a front one, as X, and a rear one, as Y—the front one, X, secured to and castering with the pole Z, and the rear one, Y, castering in an opposite direction through the medium of a rod connection, as B B', upon which is mounted my invention by cutting the rod into two pieces B and B', which together will be somewhat shorter than the original rod, then upon B' slip C, a metallic sleeve formed to loosely fit B and B', and secure such sleeve to B' by any means, as set-screw D.

On the upper side of sleeve C is a lug E, formed integral therewith, to which is pivoted lever F, carrying a spring-pressed pawl G of any usual construction, engaging a segmental rack H. To such lever F at any desired point above E, as K, is pivoted a rod M, extending rearwardly and pivoted to a lug O, formed integral upon a collar P, which may be rigidly secured in any manner, as with set-screw R, to rod B, such rod B being first slipped through collar P and into sleeve C, being free to move longitudinally within sleeve C.

The operation of my invention is as follows: When attempting to turn a furrow uphill, the tendency of the plow is to draw downhill or "to land," thereby cutting a wider furrow than the plow is of capacity to turn. To obviate this, I draw lever F back as to position F', thereby forcing collar P rearward as to position P', which carries with it rod B, thereby causing rear caster-wheel Y to assume a diagonal position, as Y', which draws the plow away from the land. In turning a furrow downhill the tendency of the plow is to cut a furrow narrower than normal, which reduces both the quality and quantity of work. To overcome this tendency, I force lever F forward, as to $F^2$, drawing the rod B to the position shown at $P^2$ and castering Y, as to $Y^2$, forcing the plow toward the land. Any degree of castering required by the exigencies of the land being plowed can be given to the rear wheel by the driver instantaneously and while the plow is in motion.

It is evident that both the form of construction and the mode of attaching may be varied to a considerable degree without departing from the spirit of my invention.

Having thus described my invention, what I claim is—

1. In a device of the kind mentioned, two rods in line with each other, a member rigidly secured to one within which the other moves longitudinally, a member rigidly secured to the other, and a connection between the two members for moving one in relation to the other.

2. In a device connecting the front and rear wheels of a wheel-plow, the combination of two rods, a sleeve rigidly secured to one, a collar rigidly secured to the other, such other moving longitudinally in the sleeve, a lever pivoted to the sleeve, and a rod pivoted to such collar and lever.

3. In combination, the front and rear caster-wheels of a wheel-plow, vertical pivots for such wheels, the front wheel secured to, controlled by and traveling in line with the pole, arms secured to the vertical pivots substantially at right angles with the line of travel of said wheels, a connection between said arms consisting of two rods, a sleeve rigidly secured to one rod, within which sleeve the other rod moves longitudinally, a collar rigidly secured to said last-named rod, a lever pivoted upon the sleeve, a segmental rack secured to the sleeve, a spring-pressed pawl upon the lever engaging the rack and a rod connecting the lever with the collar.

In testimony whereof I have affixed my signature in presence of two witnesses.

THEODORE O. TOLLACK.

Witnesses:
   JAMES LIVINGSTONE,
   MARTIN TOLLACK.